(12) United States Patent  
Hirobe

(10) Patent No.: US 6,796,661 B2
(45) Date of Patent: Sep. 28, 2004

(54) PROJECTION TYPE DISPLAY DEVICE

(75) Inventor: Toshinori Hirobe, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/634,051

(22) Filed: Aug. 4, 2003

(65) Prior Publication Data

US 2004/0027546 A1 Feb. 12, 2004

(30) Foreign Application Priority Data

Aug. 6, 2002 (JP) .......................................... 2002-229253
Jun. 30, 2003 (JP) .......................................... 2003-187140

(51) Int. Cl.$^7$ ............................................. G03B 21/14
(52) U.S. Cl. ........................................ 353/84; 348/743
(58) Field of Search ..................... 353/84, 31; 348/742, 348/743, 771

(56) References Cited

U.S. PATENT DOCUMENTS 5,463,433 A * 10/1995 Koo ............................ 353/84
5,467,146 A * 11/1995 Huang et al. ................ 348/743
5,612,753 A * 3/1997 Poradish et al. ............ 348/743
5,863,125 A * 1/1999 Doany .......................... 353/84
6,467,910 B1 * 10/2002 Sato ............................. 353/84
6,575,579 B1 * 6/2003 Ho ............................... 353/84

* cited by examiner

Primary Examiner—William C. Dowling
(74) Attorney, Agent, or Firm—Morgan & Finnegan, L.L.P.

(57) ABSTRACT

A projection type display device is provided which is compact and allows an image to be displayed in appropriate colors. A color wheel is disposed in an area interposed between a light entering a total reflection mirror and a light reflected by the mirror. This makes the device compact compared to a case where the color wheel is placed in a region outside the light. Further, the color wheel is shaped like a disk divided into a plurality of color filter sections of different colors. The color wheel is irradiated with a light converged in such a shape as to pass through only a single color filter section. Consequently, the light is properly separated to allow an image to be displayed in appropriate colors.

1 Claim, 7 Drawing Sheets

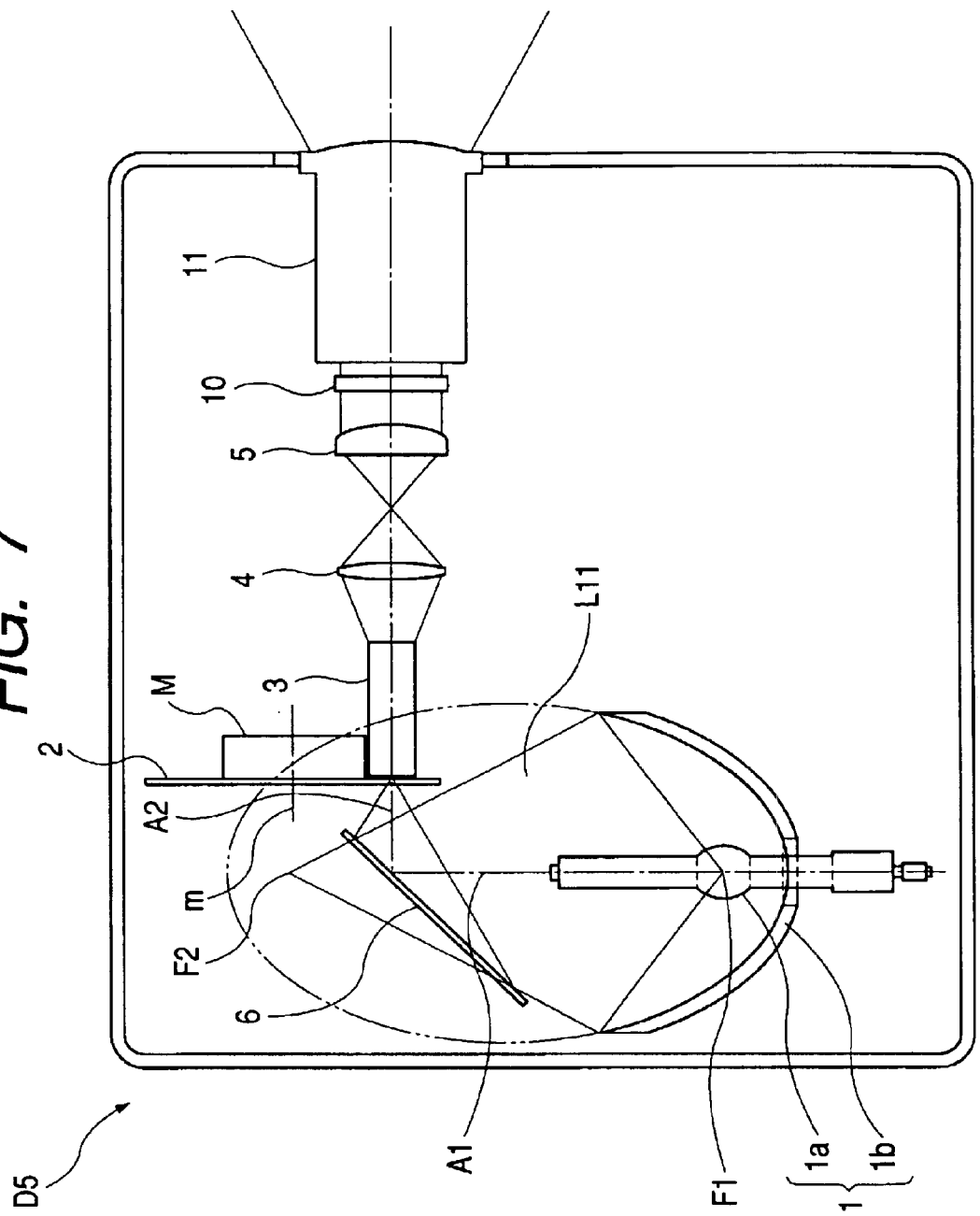

PROJECTION TYPE DISPLAY DEVICE

BACKGROUND OF THE INVENTION

1. Field of the Invention

The present invention relates to a projection type display device that displays an image on the basis of projection of a light modulated by a light valve.

2. Related Background Art

Projection type display devices of various structures have hitherto been proposed which display an image on the basis of projection of a light modulated by a light valve such as a liquid crystal panel.

One of such projection type display devices rotatively drives a color wheel to spectrally separate a white light and utilizes the separated light to achieve color display. FIG. 3 is a schematic view showing an example of a structure of a conventional projection type display device. In this figure, reference numerals 1, 1a and 1b denote a projection lamp, a lamp bulb, and an ellipsoidal reflector, respectively. Reference numerals 2, 3, 3a and 3b denote a color wheel, a rod integrator lens, an entrance end face, and an exit end face, respectively. Reference numerals 4, 5, 10, 11 and 12 denote a relay lens, a field lens, a light valve, a projection lens, and a housing, respectively. Reference characters m, M and A1 denote an axis of rotation, a motor, and an optical axis, respectively. Reference characters L11, L12 and D3 denote an exiting light, an exiting light and a projection type display device, respectively.

The projection type display device D3 comprises the projection lamp 1 that emits a white light. The projection type display device D3 has the following components sequentially arranged on its light emission side:

the color wheel 2 that sequentially separates the white light into respective colors on the basis of rotative driving effected by the motor M;

the rod integrator lens (hereinafter referred to as "rod lens") 3 used to optimally irradiate a display area of the light valve 10 with the light;

the relay lens 4;

the field lens 5;

the light valve 10 that modulates the irradiation light; and the projection lens 11 that enlarges and projects the light modulated by the light valve 10, on a screen (not shown).

FIG. 4 is a sectional view showing the structure of the projection lamp 1 in detail. As shown in this figure, the projection lamp 1 is composed of the lamp bulb 1a and the ellipsoidal reflector 1b placed behind the lamp bulb 1a. The ellipsoidal reflector 1b has a reflecting surface shaped like an ellipsoidal surface (see reference character R1) that is rotationally symmetric with respect to the optical axis A1. The ellipsoidal reflector 1b has two focuses (hereinafter referred to as "first focus F1" and "second focus F2"). The lamp bulb 1a (to be exact, its portion that emits light) is placed at the first focus F1.

Further, as shown in FIG. 5, the color wheel 2 is divided into a plurality of color filter sections 2R, 2G and 2B (for example, three color filter sections for red, blue, and green or four color filter sections for red, blue, green, and transparency). The color wheel 2 is rotatively driven by the motor M to sequentially separate the white light spectrally.

Furthermore, the rod lens 3 is an optical element shaped like a square pole and is formed of transparent glass or a resin material. The side surfaces (i.e., surfaces other than the entrance end face 3a and exit end face 3b) of the rod lens are each a total reflection surface. Further, reference numeral 12 denotes the housing.

When the projection lamp 1 is energized, the emitted light L11 is condensed by the ellipsoidal reflector 1b and then spectrally separated by the color wheel 2. The region of the light L11 that has got out of the projection lamp 1 is represented by a triangle including two sides shown by dotted lines in FIG. 4. That is, the region is a triangle region including two dotted lines that cross at the second focus F2 of the four dotted lines shown in FIG. 4. Subsequently, the light enters the rod lens 3 through the entrance end face 3a and is then totally reflected by the side surface of the rod lens 3 (or exits through the exit end face 3b without being totally reflected) to form a uniform light. The exiting light L12 passes through the relay lens 4 and the field lens 5 to produce a flux of parallel light, which then passes through the light valve 10 to be thereby converted into an optical image, which then passes through the projection lens 11 to be finally projected on the screen (not shown).

FIG. 6 shows a projection type display device D4 of another configuration. As shown by reference numeral 6 in FIG. 6, a total reflection mirror is placed above the projection lamp 1. This device is adapted to reflect a light from the projection lamp 1, from a direction along an optical axis A1 to a direction along an optical axis A2.

However, with the projection type display device D4 of the structure shown in FIG. 6, the color wheel 2 or the motor M may interfere with the ellipsoidal reflector 1b or may block the light L11 irradiated to the ellipsoidal reflector 1b by the lamp bulb 1a. This is because, as shown in the figure, the color wheel 2 is partly located in the triangular region of the light L11 getting out of the projection lamp 1.

To obviate this problem, a projection type display device D5 of another configuration has been proposed. This is shown in FIG. 7. As shown in the figure, when the color wheel 2 and the motor M are placed above the optical axis A2, a sufficient space must be provided above the optical axis A2, which poses another problem that the size of the device will increase.

SUMMARY OF THE INVENTION

It is, therefore, an object of the present invention to provide a projection type display device that is free from the above problems.

The present invention has been accomplished in view of the above circumstances and provides a projection type display device comprising a light source for emitting a white light, a reflecting means for reflecting the emitted light, a color wheel comprising a plurality of color filter sections of different colors for sequentially separating the light from the light source into different colors on the basis of rotative driving, and a light valve for modulating the separated light, the light from the light source being separated by the color wheel, modulated by the light valve and then projected, wherein the color wheel is disposed in an area interposed between a light entering (or incident on) the reflecting means and a light exiting the reflecting means such that the light from the light source passes through the color wheel in such a converged shape as to pass through only a single color filter section.

BRIEF DESCRIPTION OF THE DRAWINGS

FIG. 7 is a schematic view showing another example of a structure of a conventional projection type display device.

DESCRIPTION OF THE PREFERRED EMBODIMENTS

Figure 1:
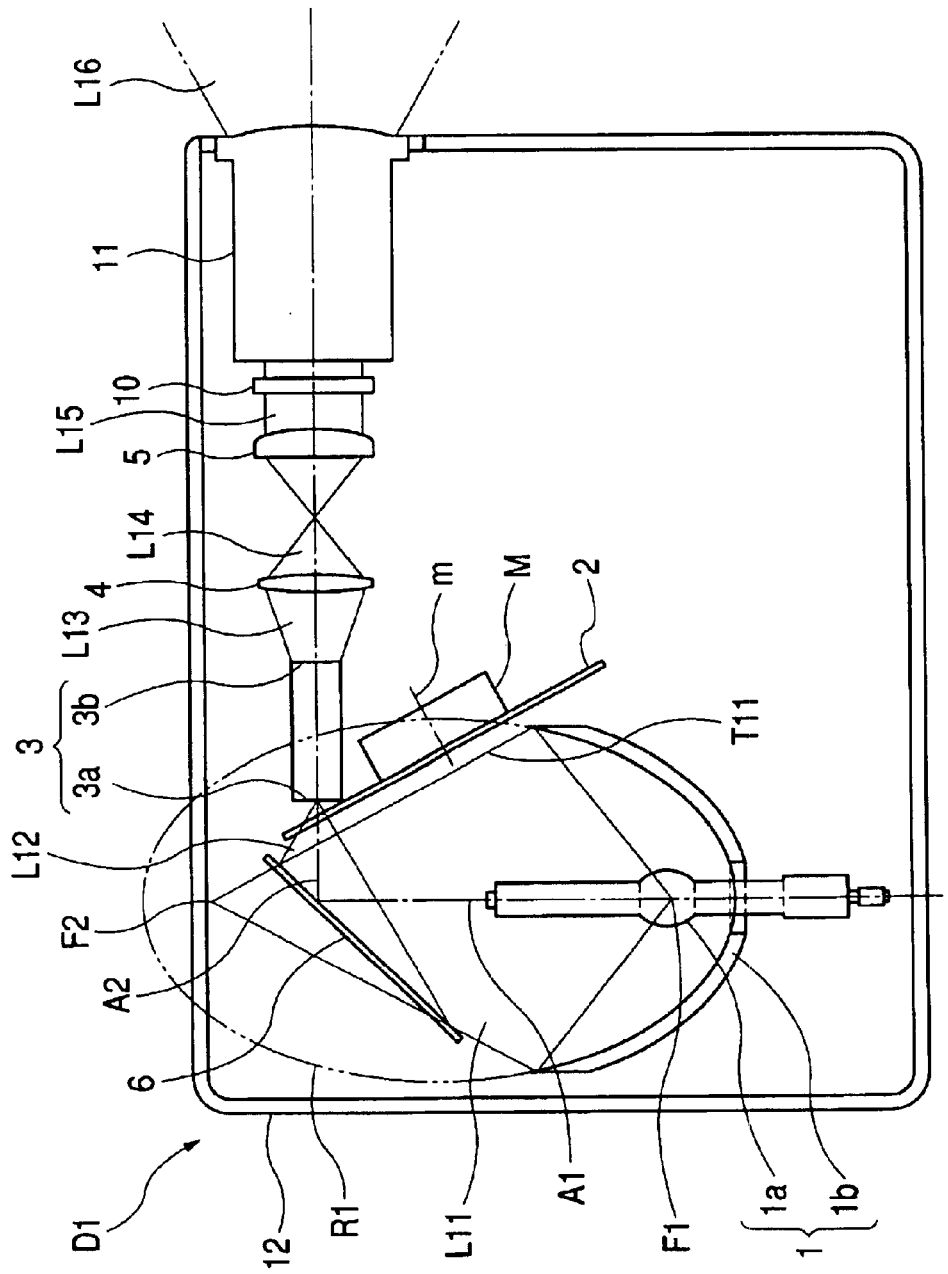
FIG. 1 is a schematic view showing an example of a structure of a projection type display device according to the present invention.

An embodiment of the present invention will be described with reference to the drawings. Parts of the same structures as those in the prior art are denoted by the same reference numerals. Their description is thus omitted.

A projection type display device according to the present embodiment comprises, as shown by reference character D1 in FIG. 1, a light source 1 that emits a white light, a reflecting means 6 for reflecting the emitted light, a color wheel 2 that sequentially separates the light from the light source 1 into different colors on the basis of rotative driving thereof, and a light valve 10 that modulates the separated light. The light from the light source 1 is spectrally separated by the color wheel 2, then modulated by the light valve 10 and is finally projected. The reflecting means 6 is located so as to reflect the light at a point nearer to the light source 1 than the second focus is.

Figure 5:
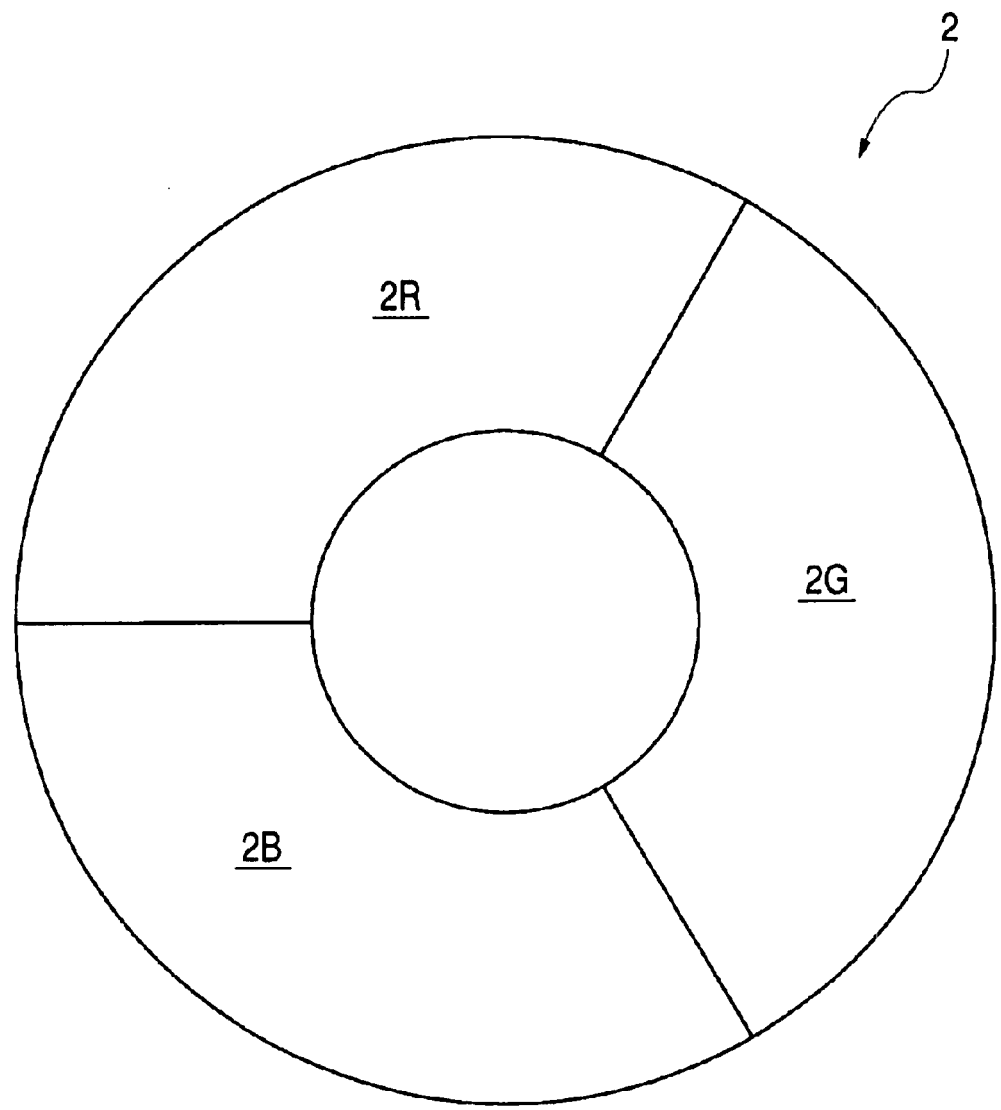
FIG. 5 is a view illustrating the shape of a color wheel.

The color wheel 2 is, as shown in FIG. 5, divided into a plurality of color filter sections 2R, 2G, and 2B of different colors and is adapted to subject the white light from the light source 1 to time-division color separation on the basis of rotative driving effected by a motor M.

The presence of the reflecting means 6 forms an area interposed between a light entering the reflecting means 6 (that is, light L11 traveling along an optical axis A1) and a light exiting the reflecting means 6 (that is, light L12, light L13 and light L14 traveling along an optical axis A2). However, the color wheel 2 is disposed in this area (the area interposed between the light L11 entering the reflecting means 6 and the light L12 exiting the reflecting means 6). In other words, with the device shown in FIG. 1, when viewed in a direction perpendicular to the drawing of FIG. 1, the angle formed between the optical axes A1 and A2 is about 90°, so that the optical axes A1 and A2 divide the space into a region with a central angle of about 90° and a region with a central angle of about 270°, and the color wheel 2 is located in the region of 90°, not in the region of 270°. That is, it can be said that the color wheel 2 is disposed outside the above-mentioned triangular area. This placement of the color wheel 2 serves to make the device compact.

Figure 2:
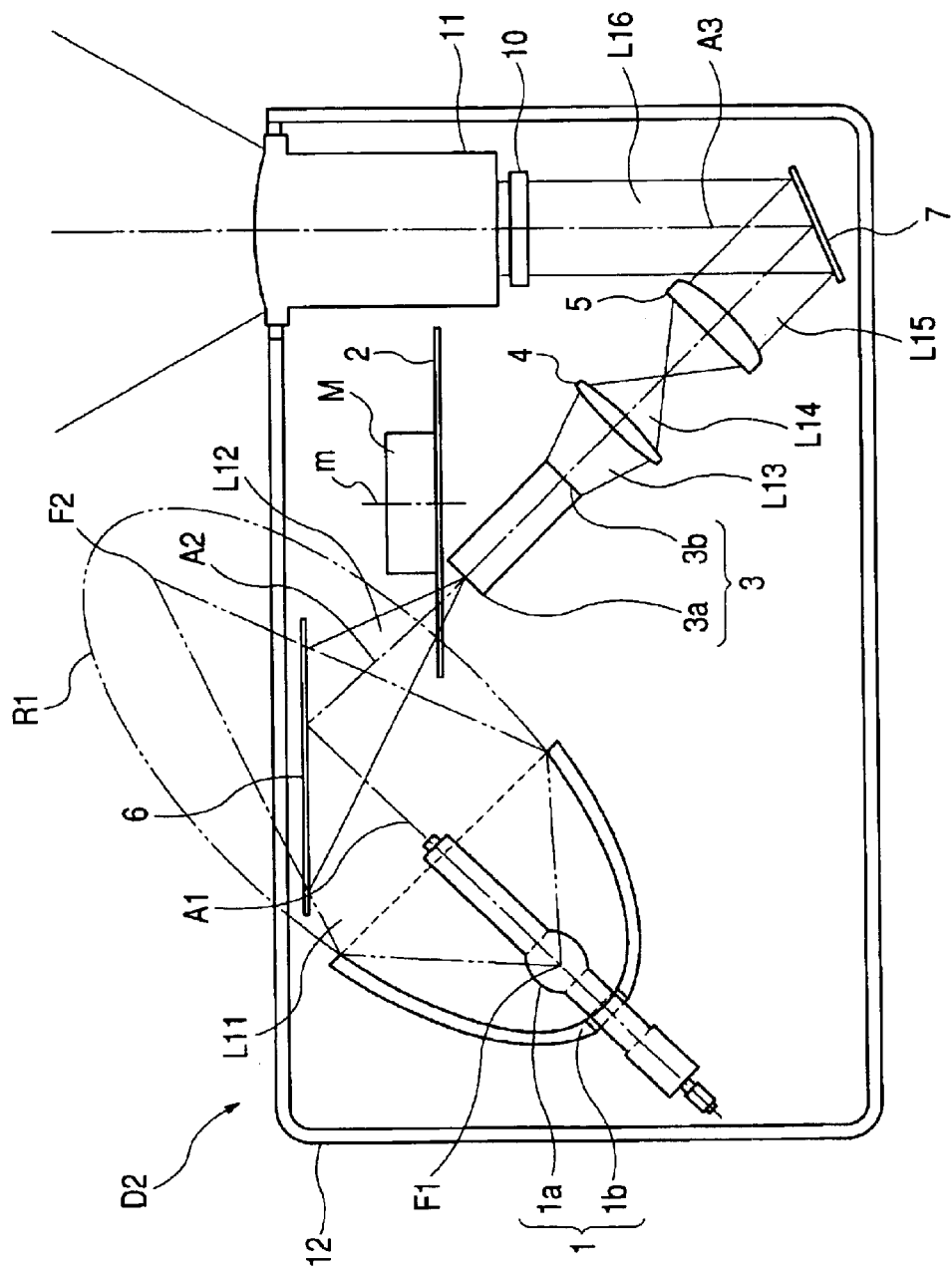
FIG. 2 is a schematic view showing another example of a structure of a projection type display device according to the present invention.
Figure 3:
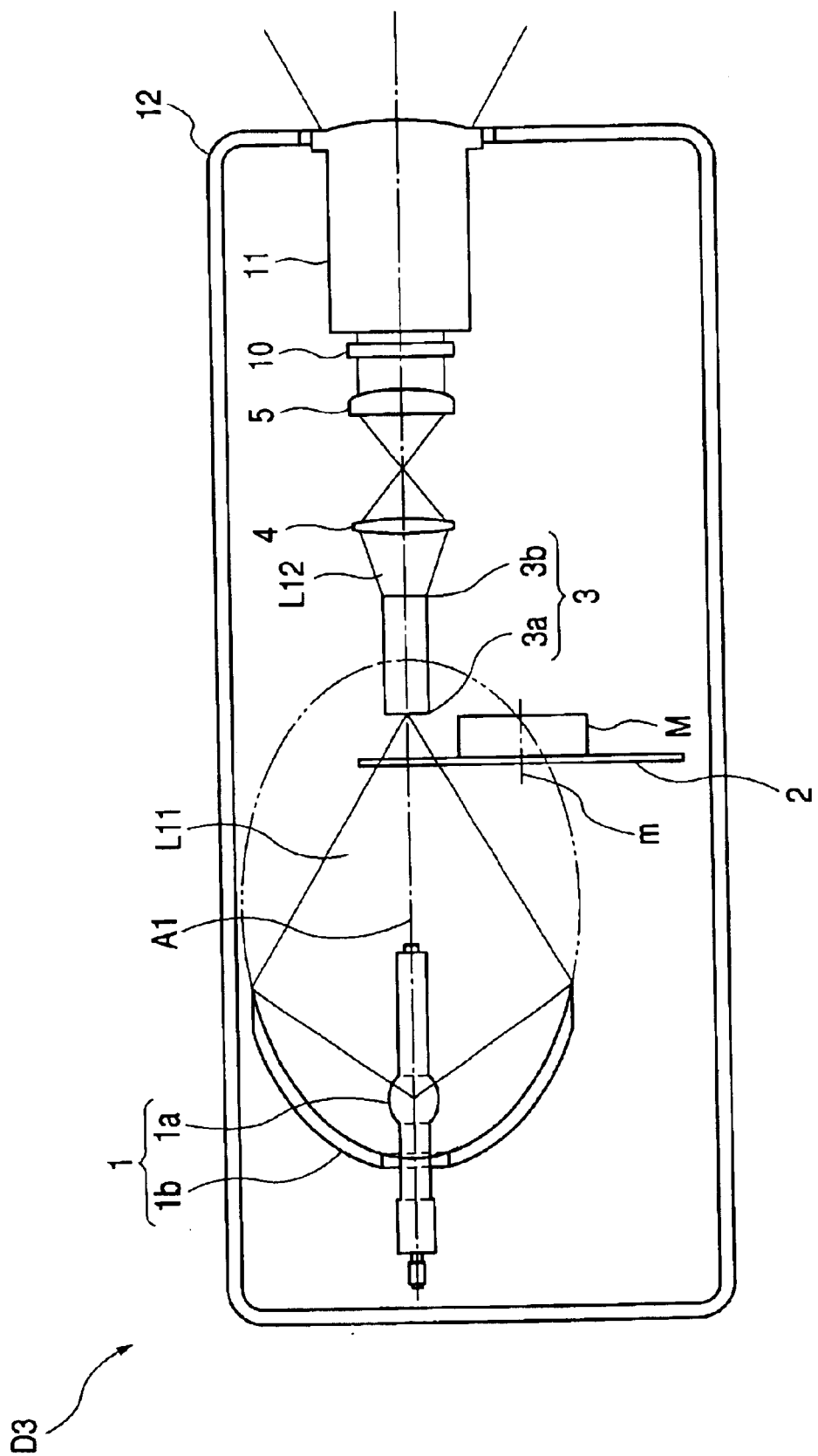
FIG. 3 is a schematic view showing an example of a structure of a conventional projection type display device.
Figure 4:
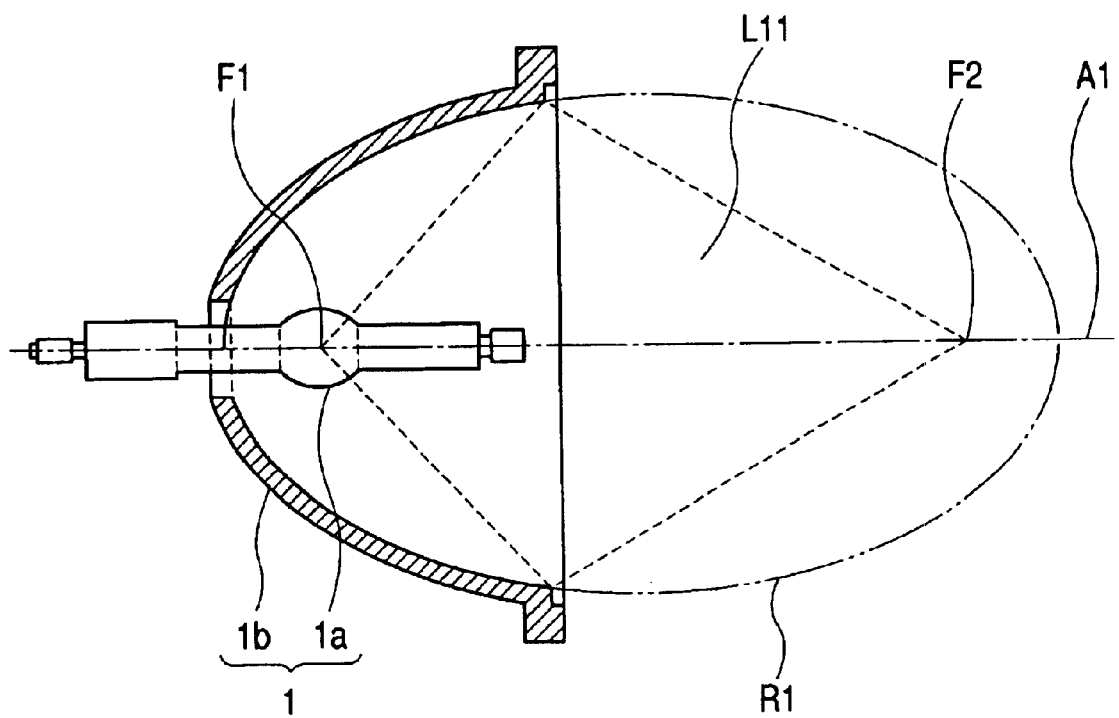
FIG. 4 is a sectional view showing the structure of a projection lamp 1 in detail.

With a projection type display device D2, shown in FIG. 2, the color wheel 2 is disposed in an area interposed between optical axes A2 and A3, not in the area interposed between the optical axes A1 and A2. Accordingly, in the embodiment of this figure, the term "reflecting means" used herein does not mean the member denoted by reference numeral 6 but means the member denoted by reference numeral 7. In the configuration of FIG. 2, the projection lamp 1 as a light source is obliquely provided in a housing 12. Since a lamp bulb 1a of the projection lamp 1 is elongate, when the lamp bulb 1a is provided so that its longitudinal direction extends along a direction in which the light exits the reflecting means 7, the size of the housing 12 must be correspondingly increased in the direction in which the light exits the reflecting means 7. However, in the projection type display device according to the embodiment shown in FIG. 2, the lamp bulb 1a has its longitudinal direction inclined at an angle to the direction in which the light exits the reflecting means 7. This makes it possible to reduce the width of the housing 12 in the direction light exits the reflecting means 7. Therefore, the device can be miniaturized.

Further, to separate the light emitted by the light source 1, the light need to pass through the color wheel 2. However, if the light emitted by the light source 1 passes through the color wheel 2 in an insufficiently converged state (that is, in a state such that when passing through the color wheel, the light has a cross section that does not fall within a single color filter section 2R, 2G or 2B), the color separation is not properly effected, so that a resulting image will be displayed in inappropriate colors. In the present invention, in view of the above, there is defined the above-mentioned condition that the light from the light source 1 passes through the color wheel 2 in such a converged shape as to pass through only a single color filter section 2R, 2G or 2B (that is, in a state such that when passing through the color wheel, the light has a cross section that falls within the single color filter section 2R, 2G or 2B). Incidentally, because the color wheel 2 is rotatively driven as described above, there is a case where the light may pass through the color wheel 2 so as to extend over two color filter sections, depending on its rotating position. The above expression "when passing through the color wheel, the light has a cross section that falls within the single color filter section 2R, 2G or 2B" is not intended to exclude such a case. That is, the condition "in such a converged shape as to pass through only a single color filter section 2R, 2G or 2B" defined herein is met as long as the state "when passing through the color wheel, the light has a cross section that falls within the single color filter section 2R, 2G or 2B" is established with a fixed rotational period, and there may be the state in which the light passes through the color wheel 2 so as to extend over two color filter sections, as a transitional state.

Figure 6:
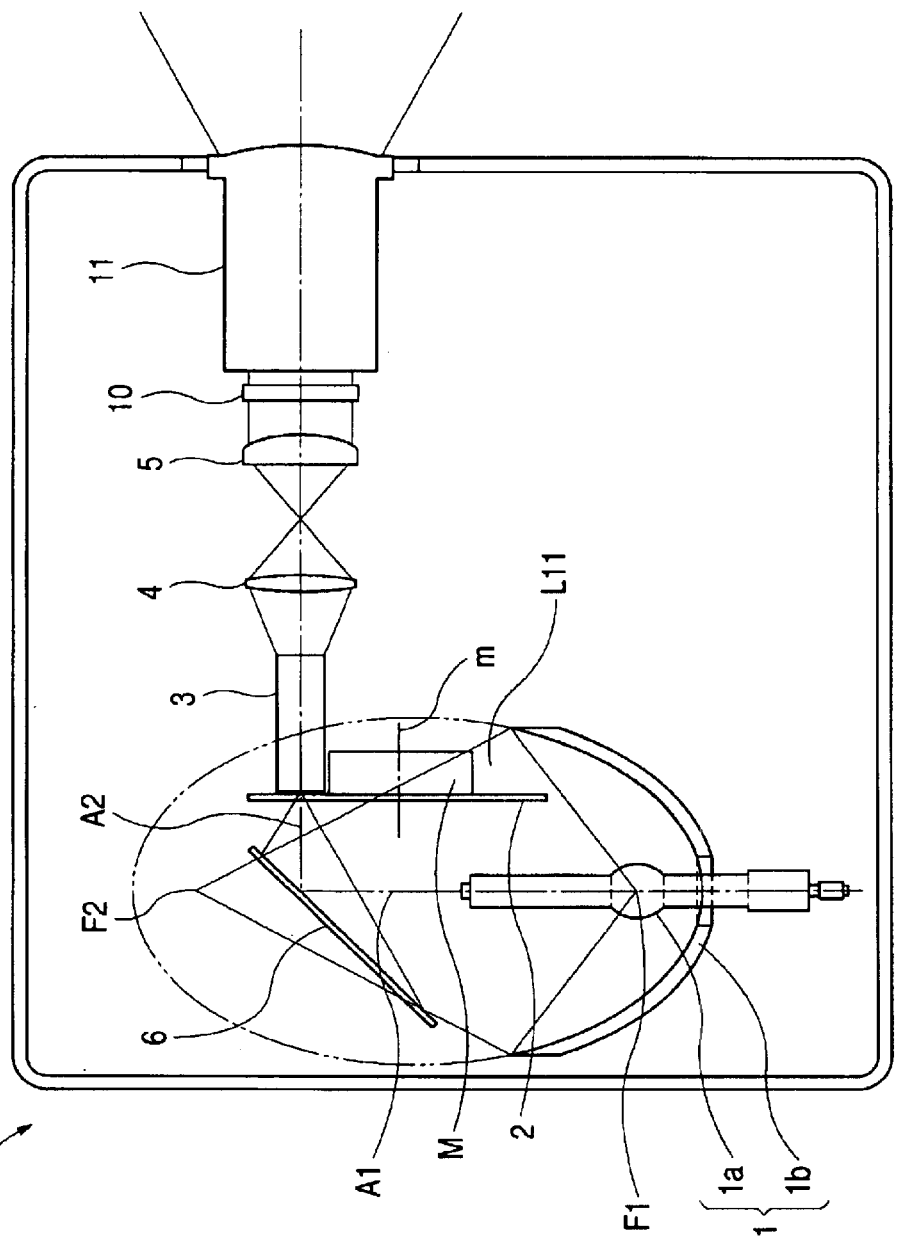
FIG. 6 is a schematic view showing another example of a structure of a conventional projection type display device.

With the device shown in FIG. 6, the light reflected by the total reflection mirror 6 is irradiated to the upper part of the color wheel 2, prior to which the light reflected by the ellipsoidal reflector 1b has already interfered with the lower part of the color wheel 2. In the former case (that is, in the case where the light reflected by the total reflection mirror 6 is irradiated to the upper part of the color wheel 2), the light from the light source 1 can be converged into such a shape as to pass through only a single color filter section to effect "separation of light". However, in the latter case (that is, in the case where the light reflected by the ellipsoidal reflector 1b interferes with the lower part of the color wheel 2), the light from the light source 1 is not converged into such a shape as to pass through only a single color filter section, which does not fall within the scope of the present invention.

To attain the state "the light from the light source 1 passes through only a single color filter section 2R, 2G or 2B", as shown in FIG. 1, a central axis of rotation m of the color wheel 2 may be set substantially perpendicularly to an edge line T11 of the converged light L11, not parallel to the optical axis A2. By setting the central axis of rotation m of the color wheel 2 and the optical axis of the light passing though the color wheel 2 so as to be not parallel to each other, the light from the light source 1 is prevented from interfering with the color wheel before being converged into the above-mentioned shape (that is, "such a shape as to pass through only a single color filter section 2R, 2G or 2B").

Further, it is preferred to arrange, between the color wheel 2 and the light valve 10, a rod lens 3 for adjusting an illuminated area and an illuminating optical system 4 and 5 for making a plurality of color components obtained by the time-division color separation to enter the light valve 10.

Furthermore, a projecting means 11 may be provided which enlarges and projects the light modulated by the light valve 10, on a screen (not shown).

Moreover, the light valve 10 may either be a transmission or reflection type.

Furthermore, the present invention is not limited to the front-projection type display device but may be used for a rear-projection type display device.

Now, description will be given of the action and effect of the embodiments of the present invention.

According to the embodiments, a white light from the light source 1 is subjected to time-division color separation and a visual color mixture phenomenon can be utilized to display a color image.

According to the embodiments, because the color wheel 2 is placed in an area interposed between a light entering the reflecting means 6 (see, e.g., L11 in FIG. 1) and a light exiting the reflecting means 6 (see, e.g., L12 in FIG. 1), it is possible to make the device compact.

Furthermore, the configuration is adopted in which a light from the light source 1 passes though the color wheel 2 in such a converged shape as to pass through only a single color filter section 2R, 2G or 2B, so that proper color separation can be effected to allow an image to be displayed in appropriate colors.

Moreover, according to the embodiments, it is possible to avoid interference between the color wheel 2 and the light source 1.

EXAMPLES

The present invention will be described below in further detail using examples.

Example 1

In this example, the projection type display device D1 shown in FIG. 1 was produced. Parts of the same structures as those shown in FIGS. 3 to 7 are denoted by the same reference numerals. Duplicate description is thus omitted.

In this example, the projection lamp (light source) 1 was provided so that its optical axis A1 extended perpendicularly to the projecting optical axis of the projection lens. The projection lamp 1 was composed of the lamp bulb 1a and the ellipsoidal reflector 1b, placed at the back of the lamp bulb 1a. The ellipsoidal reflector 1b was shaped like an ellipsoidal reflecting surface (see reference character R1) that was rotationally symmetric with respect to the optical axis A1. Further, the lamp bulb 1a (to be exact, its portion that emits light) was placed at the first focus F1. The total reflection mirror (reflecting means) 6 was placed in front of (i.e., above in FIG. 1) the lamp bulb 1a.

Because the lamp bulb 1a was provided such that its emission center was located at or near the first focus F1 of the ellipsoidal shape R1 of the ellipsoidal reflector 1b, the light from the lamp bulb 1a was reflected frontward by the ellipsoidal reflector 1b while being converged. Thus, the light L11 was reflected along the optical axis A2 by the total reflection mirror 6 to be converged to one point (see L12) and guided into the rod lens 3. The color wheel 2, which was driven by the motor M, was disposed close to the point to which the light was converged (that is, on the optical axis A2 between the total reflection mirror 6 and the rod lens 3 and in the vicinity of the entrance end face 3a of the rod lens 3), so that the light L12 was subjected to time-division color separation. Then, it was possible to utilize a visual color mixture phenomenon to display a color image.

The angle formed between the axis A1 of the light incident on the total reflection mirror 6 and the axis A2 of the light exiting the total reflection mirror 6 was about 90°, and the color wheel 2 designed as shown in FIG. 5 (that is, shaped like a disk divided into the color filter sections 2R (red), 2G (green) and 2B (blue)) was placed in the area interposed between the axes A1 and A2, thus making the device compact.

Further, the light L11, reflected by the ellipsoidal reflector 1b, was converged as shown in FIG. 1, and the color wheel 2 was provided so as to extend along the edge line T11 of the light L11. That is, the color wheel 2 was disposed such that the axis of rotation m of the color wheel 2 was not parallel to the optical axis A2 but was perpendicular to the edge line T11 of the condensed light L11. Thus, because the configuration was adopted in which the light was converged into such a shape as to pass through only a single color filter section 2R, 2G or 2B and then passed through the color wheel 2, the light was properly separated to enable an image to be displayed in appropriate colors.

Example 2

In the present example, the projection type display device D2 shown in FIG. 2 was produced. Specifically, the projection lamp 1 was disposed such that the angle formed between the optical axis A1 and the projecting optical axis of the projection lens 11 was about 45°, and the total reflection mirror 6 was disposed above the projection lamp 1 so as to extend in a substantially horizontal direction. Furthermore, the color wheel 2 was placed below the total reflection mirror 6 so as to extend in a substantially horizontal direction, and the components including the rod lens 3, the relay lens 4, the field lens 5, the total reflection mirror (reflecting means) 7 and so on were arranged along the optical axis A2. Then, the light valve 10, the projection lens 11, and others were arranged above the total reflection mirror 7.

The lamp bulb 1a was disposed such that its emission center was located at or near the first focus F1 of the ellipsoidal shape R1 of the ellipsoidal reflector 1b, so that the light from the lamp 1a was reflected frontward by the ellipsoidal reflector 1b while being converged. Then, the light L11 was reflected along the optical axis A2 by the total reflection mirror 6 and passed through the color wheel 2 in the thus converged state to be spectrally separated. Subsequently, the light passed through the rod lens 3, the relay lens 4 and the field lens 5, was reflected by the total reflection mirror 7, and was further guided by the light valve 10 and the projection lens 11 to allow a color image to be displayed.

The angle formed between the axis A2 of the light incident on the total reflection mirror 7 (see L12, L13, L14 and L15) and the axis A3 of the light exiting the total reflection mirror 7 (see L16) was about 45°, and the color wheel 2 designed as shown in FIG. 5 (that is, shaped like a disk divided into the color filter sections 2R (red), 2G (green) and 2B (blue)) was placed in the area interposed between the axes A2 and A3, thereby making the device compact.

Further, because the configuration was adopted in which the light was converged into such a shape as to pass through only a single color filter section 2R, 2G or 2B and then passed through the color wheel 2, the light was properly separated to enable an image to be displayed in appropriate colors.

As described above, according to the present invention, because a color wheel is disposed in an area interposed between a light that enters a reflecting means and a light that exits the reflecting means, it is possible to make the device compact.

Further, because a light from a light source passes through a color wheel in such a converged shape as to pass through only a single color filter section, the light is properly separated to allow an image to be displayed in appropriate colors.

What is claimed is:

1. A projection type display device comprising:

a light source for emitting a white light;

an ellipsoidal reflector provided behind the light source and having a reflecting surface inside thereof such that the light source is positioned on the reflecting surface side, the reflecting surface constituting a part of the contour of an ellipsoidal region that is rotationally symmetric with respect to the optical axis, the ellipsoidal region having a first focus close to the light source and a second focus distant from the light source on the optical axis;

a reflecting means provided within the ellipsoidal region of the ellipsoidal reflector for changing the direction of the optical axis of the white light emitted from the light source;

a color wheel comprising a rotative member having a plurality of color filter sections of different colors for separating the white light reflected from the reflecting means into different colors; and a light valve for modulating the light separated by the color wheel, wherein a rotation center of the rotative member of the color wheel is positioned within the ellipsoidal region of the ellipsoidal reflector, the axis of rotation of the rotative member is not parallel to the optical axis but is inclined at an angle other than a right angle to the optical axis, and the rotative member is positioned outside of a conical region formed by an edge and the second focus of the ellipsoidal region of the ellipsoidal reflector.

* * * * *